United States Patent [19]
Gamou et al.

[11] Patent Number: 5,129,124
[45] Date of Patent: Jul. 14, 1992

[54] CLEANING MACHINE

[75] Inventors: Akira Gamou; Shoji Sakai; Yoshiaki Kanoh, all of Tokyo; Kenichi Osonoe, Kanagawa; Akio Terai; Masayoshi Tsuchiya, both of Tokyo, all of Japan

[73] Assignee: Komatsu Zenoah Company, Japan

[21] Appl. No.: 604,685

[22] Filed: Oct. 26, 1990

[30] Foreign Application Priority Data

Oct. 30, 1989 [JP] Japan ................... 1-279973

[51] Int. Cl.$^5$ ............................................. A47L 5/28
[52] U.S. Cl. ................................. 15/352; 15/353; 55/345; 55/346; 55/347; 55/348; 55/457; 55/DIG. 3; 55/429
[58] Field of Search ............... 15/347, 352, 353; 55/337, 345, 346, 347, 348, 456, 457, DIG. 3

[56] References Cited

U.S. PATENT DOCUMENTS

| | | | |
|---|---|---|---|
| 2,719,596 | 10/1955 | Kent et al. ................... | 15/352 X |
| 2,985,905 | 5/1961 | Caufield ...................... | 15/353 |
| 3,308,609 | 3/1967 | McCulloch et al. .......... | 55/337 X |
| 3,360,909 | 1/1968 | Barnerias ..................... | 55/348 |
| 3,425,192 | 2/1969 | Davis ........................... | 55/345 |
| 3,877,902 | 4/1975 | Eriksson et al. ............. | 55/DIG. 3 X |
| 3,915,679 | 10/1975 | Roach et al. ................ | 55/347 |
| 4,868,948 | 9/1989 | Arnold ......................... | 15/352 X |

FOREIGN PATENT DOCUMENTS

1172611 7/1967 United Kingdom .

*Primary Examiner*—Chris K. Moore
*Attorney, Agent, or Firm*—Marger, Johnson, McCollom & Stolowitz, Inc.

[57] ABSTRACT

A cleaning machine includes a frame having wheels, a suction blower having an air inlet and an air outlet and mounted on the frame, an intake opening communicating with the air inlet of the suction blower for sucking dirt containing relatively large dirt such as fallen leaves and relatively small dirt such as dust together with air by the sucking force generated by the suction blower, a dirt separator communicating with the air outlet of the suction blower by means of a duct for separating the dirt from the air blown out from the suction blower, and a dirt receptable for collecting the relatively large dirt separated by the dirt separator, and the dirt receptacle detachably attached under the main separator. The dirt separator includes a main separator for separating the relatively large dirt in the air from the suction blower and a subseparator for separating the relatively small dust from the air having passed through the main separator, and the subseparator comprises a plurality of centrifugal dust separators for separating the relatively small dirt from the air passing therethrough by the assistance of centrifugal force.

15 Claims, 16 Drawing Sheets

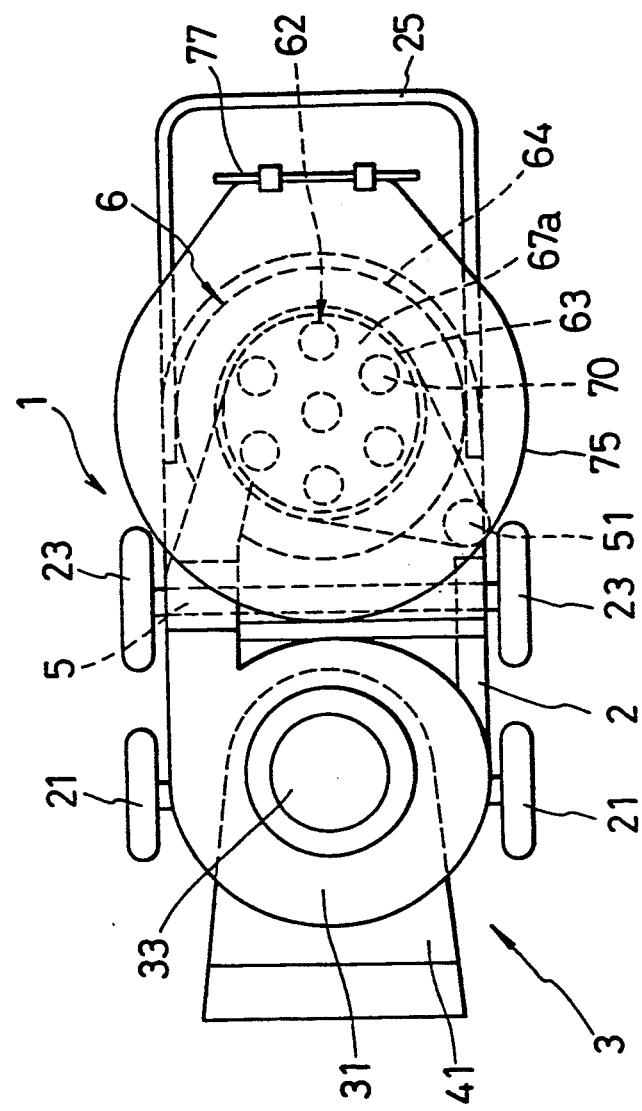

CLEANING MACHINE

BACKGROUND OF THE INVENTION

1. Field of the Invention

This invention relates to a cleaning machine, in particular to a cleaning machine which comprises a suction blower driven by an engine and mounted on a frame, a dirt intake communicating with an inlet of the suction blower, a dirt separator communicating with an outlet of the suction blower by means of a duct, and a dirt collecting receptacle disposed under the separator, in which the cleaning machine sucks dirt such as fallen leaves and dust together with air by the sucking force generated by rotation of the engine of the suction blower and collects it into the the receptacle by separating it from the air by the separator.

2. Description of the Prior Art

This type of cleaning machine sucks dirt such as fallen leaves and dust together with air and discharges the air after separating the dirt therefrom. If the air still contains much dust and it is brown off, the dust spreads into the open air, which contaminates the environment or injures the health of the operator. In view of this, it has been desired that such dust should be removed from the discharged air as much as possible. For this purpose, various types of filters such as a filter formed by folding a zigzag filter material into a ring shape is used for removing the dust.

However, a folded filter is likely to be clogged with the dust remaining in the air, which results in increased resistance to air passing through the filter. This causes the sucking power to decrease. Further, in a cleaning machine having such a filter, the filtering capability is likely to be decreased, especially when water or moisture is contained in the air or dirt. For these reasons, it is necessary to frequently clean and replace the filter, thus leading to troublesomeness in maintenance of the machine.

SUMMARY OF THE INVENTION

Accordingly, an main object of this invention is to provide a cleaning machine having a dirt separator which is not prone to being clogged with dust contained in the dirt and which can deal with air containing water or moisture as well as wet dirt.

In order to attain the above object, the cleaning machine of the present invention comprises a frame having wheels; a suction blower having an air inlet and an air outlet and mounted on the frame; an intake opening for sucking dirt together with air by the sucking force generated by the suction blower, the intake opening in communication with the air inlet of the suction blower; a dirt separator in communication with the suction blower by means of a duct; and a dirt collecting receptacle detachably attached under the separator. The separator comprises a main separator for separating relatively large dirt such as fallen leaves and a subseparator for separating relatively small dirt such as dust contained in the air which has passed through the main separator. The subseparator comprises a plurality of centrifugal dust separators.

According to the present invention having the above structure, the relatively large dirt such as fallen leaves and pieces of waste paper is separated by the main separator and then collected into the dirt collecting receptacle. The air then leaves the main separator and enters the subseparator, where the dust is removed by a plurality of centrifugal dust separators. The air is then discharged from the cleaner. Since these centrifugal dirt separators separate the dust by the assistance of centrifugal force instead of filtering, they are not clogged with the dust and their separating capability is not decreased even if moisture is contained in the air or the dirt is wet.

Further, the cleaning machine of the present invention may be provided with a dust discharging duct for discharging the dust separated by the subseparator. The dust discharging duct may have an outlet which opens near the ground. By use of this construction, spreading of the discharged dust can be considerably suppressed.

Furthermore, an auxiliary dust collecting receptacle may be attached to the outlet of the dust discharging duct for catching the dust separated by the subseparator. According to this construction, it becomes possible to further suppress discharge and spreading of the small dust.

Furthermore, the subseparator may comprises a plurality of first centrifugal dust separators for separating the dust in the air discharged from the main separator and a plurality of second centrifugal dust separators for separating the dust in the air discharged from the first centrifugal separators. According to this construction, it becomes possible to considerably decrease the amount of the air discharged with the dust separated by the subseparator to 4 percent of the amount of the air sucked in. As a result, dispersion of the discharged small dust can be further suppressed or collection of the small dust into a dust collecting bag is made easier.

Moreover, the cleaning machine of this invention may be provided with a hood which allows the direction of the outlet for the air discharged from the subseparator to be changed according to the working conditions. This construction can effectively prevent the operator from being exposed to the air discharged from the machine.

The other objects, structures, and advantages of the present invention will become apparent from the detailed description of the preferred embodiments of this invention hereinbelow.

BRIEF EXPLANATION OF THE DRAWINGS

FIG. 2 shows a plan view of the first embodiment;

DETAILED DESCRIPTION OF THE PREFERRED EMBODIMENTS

Figure 1:
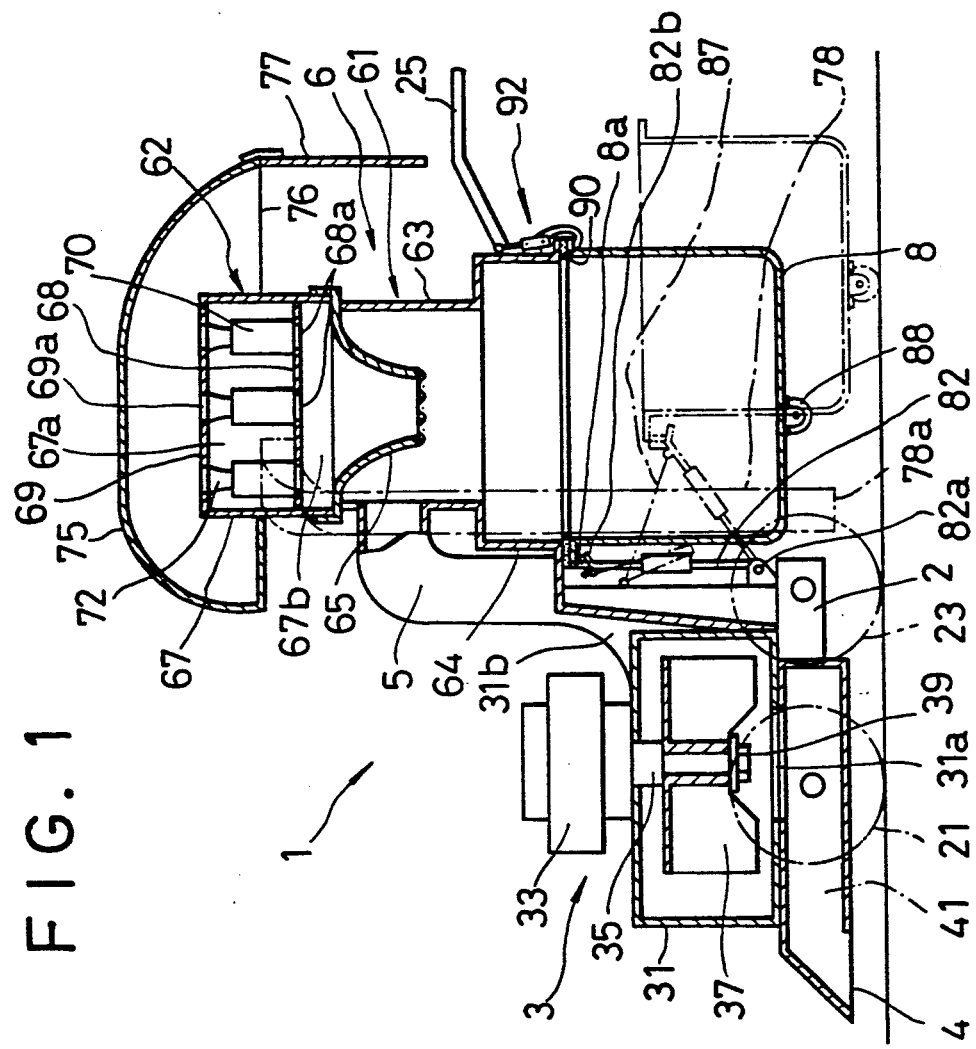
FIG. 1 shows a side sectional view of the first embodiment of the present invention.
Figure 5:
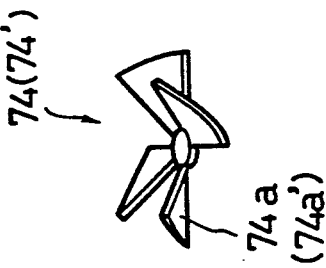
FIG. 5 shows a perspective view of the vane.
Figure 4:
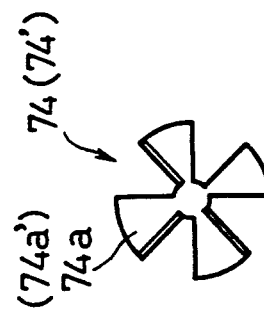
FIG. 4 shows a plan view of the vane of the above centrifugal separators.
Figure 3:
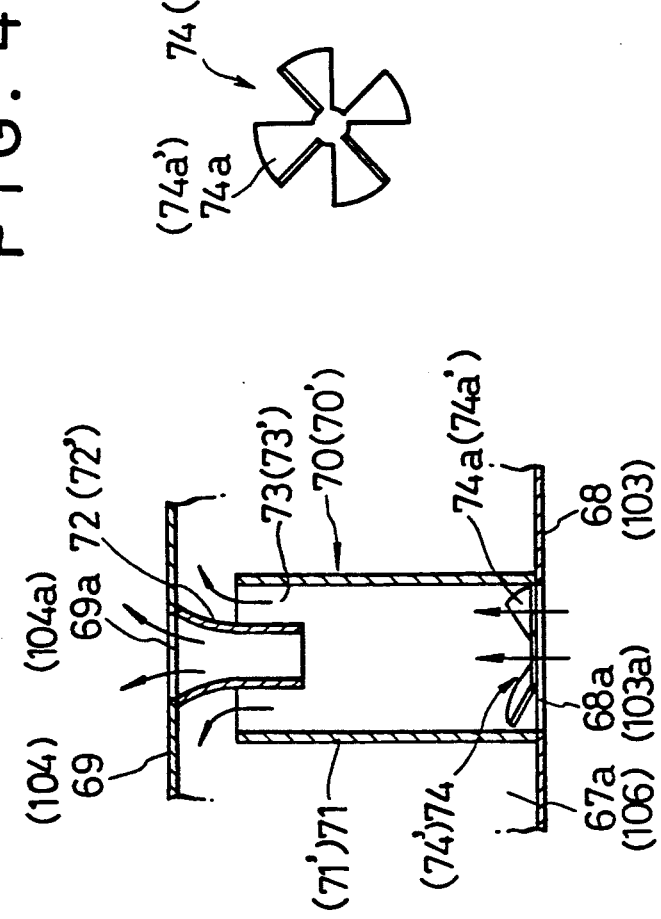
FIG. 3 shows a side sectional view of one of the centrifugal separators of the first embodiment.

The first embodiment of the present invention will be described below in detail with reference to the accompanying drawings.

FIGS. 1 to 11 show the first embodiment of the present invention. As clearly shown in FIGS. 1 and 2, the cleaning machine 1 of this embodiment comprises a frame 2, a suction blower 3 mounted on the frame 2, an intake opening 4 communicating with the suction blower 3, a dirt separator 6 communicating with the suction blower 3 through a duct 5, and a dirt collecting receptacle 8 which is detachably attached to the bottom of the dirt separator 6 so as to receive the dirt separated in the dirt separator 6 therein.

The frame 2 is provided with front wheels 21 and rear wheels 23 to make the frame movable and a steering handle 25 extending rearward from the frame 2.

The blower 3 is mounted on the front part of the frame 2. This blower 3 includes a housing 31 mounted on the frame 2, which is provided with an air inlet 31a and an air outlet 31b. An engine 33 is provided on the top of the housing 31. A fan 37 is secured on the end of the crank shaft 35 (rotating shaft) of the engine 33 by a nut 39 and rotated horizontally by the engine 33.

The intake opening 4 is opened downward at the vicinity of the ground in front of the frame 2. This intake opening 4 communicates with the air inlet 31a of the suction blower 3 through an intake opening duct 41 to suck dirt such as fallen leaves and dust on the ground along with the air flow generated by the fan 37 in the suction blower. The entrained dirt is carried by the air from the housing 31 toward the air outlet 31b thereof.

The outlet 31b of the suction blower 3 communicates with the dirt separator 6 located above the rear of the frame 2 by means of the duct 5. This dirt separator 6 comprises a main separator 61 for separating relatively large dirt such as fallen leaves and waste papers in the air and a subseparator 62 for separating small dirt such as dust in the air which has passed through the main separator.

The main separator 61 comprises a smaller-diameter cylindrical part 63 to which the duct 5 is connected, a larger-diameter cylindrical part 64 concentrically connected to the bottom of the smaller-diameter cylindrical part 63, and a funnel-shaped exhaust guide 65 which is concentric with the smaller-diameter cylindrical part 63 and downward extends in the smaller-diameter cylindrical part from the top end thereof. The duct 5 is lead to the smaller-diameter cylindrical part 63 along a tangential line of the smaller-diameter cylindrical part 63 and opened into the upper-part of the smaller-diameter cylindrical part 63 so that the air blown from the suction blower 3 whirls along the inner side of the smaller-diameter cylindrical part 63. The upper part of the exhaust guide 65 is bent upward in the form of a cylinder.

Mounted on the top of the main separator 61 is the subseparator 65, fitted in the cylindrical part of the exhaust guide 65. The subseparator 62 includes a cylindrical dust separating chamber 67. The dust separating chamber 67 is partitioned into an upper chamber 67a and a lower chamber 67b by means of a bottom partition plate 68, in which a plurality of holes 68a are formed. The top end of the dust separating chamber 67 is covered by a top plate 69.

A plurality of centrifugal dust separators 70 are located in the upper chamber 67a of the dust separating chamber 67. Each of the centrifugal dust separators 70 includes an outer cylinder 71 which extends vertically from the bottom partition plate 68 in the upper chamber 67a. The bottom end of the outer cylinder 71 is attached to the bottom partition plate so as to enclose one of holes 68a formed in the bottom partition plate 68, thereby communicating with the exhaust guide 65 through the hole 68a. The top end of each outer cylinder 71 is open in the upper chamber 67a, into which the bottom end of a funnel-shaped exhaust guide 72 is extended so as to form an appropriate space between the outer cylinder 71 and the funnel-shaped exhaust guide 72. The top end of each funnel-shaped exhaust guide 72 is connected to a hole 69a formed in the top plate 69 right above the outer cylinder 71. Provided in the bottom part of each outer cylinder 71 is a vane 74 having four swirl vane members 74a which are slanted in the tangential direction such that the air from the exhaust guide 65 of the main separator 61 flows upward with whirling within the outer cylinder 71.

Mounted on the subseparator 62 is a hood 75 which guides the air from the centrifugal dust separator 70 of the subseparator 62 as shown in FIGS. 1 and 2. The hood 75 is provided with an outlet 76 directed downward at the rear-right side of the cleaning machine. This outlet 76 may be disposed at any position. In addition, a filtering net may be attached at the outlet 76 or any other place in the dust discharge path. A wind shield 77 is extends downwardly from the rear-half circumference of the outlet 76 to prevent the operator from being exposed to the air discharged from the outlet 76. This wind shield may be mounted on the handle 25. In addition a pocket may be provided on the wind shield 77 as necessary for carrying dust bags.

Figure 11:
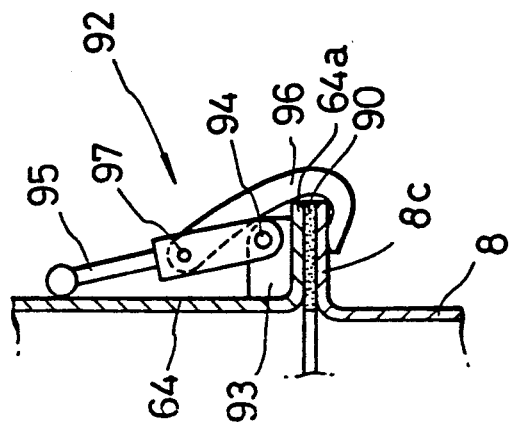
FIG. 11 shows a sectional view of the auxiliary dust collecting bag attached to the dust discharge duct from the subseparator in the embodiment.

Connected to the upper chamber 67a of the dust separating chamber 67 of the subseparator 62 is a dust discharging duct 78 which extends downwardly below the cleaning machine and has a dust outlet 78a which opens close to the ground. An auxiliary dust receptacle 79 such as a cloth bag may be attached to the dust outlet 78a as shown in FIG. 11. In that case, spreading of the dust can be effectively suppressed.

A cylindrical dirt collecting receptacle 8 made of an impervious material is attached to the bottom end of the larger-cylindrical part 64 of the main separator 61 through a ring packing 90 fastened between them as clearly shown in FIG. 1. The dirt collecting receptacle 8 is detachably mounted to the bottom flange 64a of the larger-cylindrical part 64 of the main separator 61 by means of a pivoting rod 82 whose bottom end is mounted about a pivot shaft 82a on the frame 2 as shown in FIG. 1. That is, lip 8a extends downwardly from top flange 8b of the dirt collecting receptacle 8 and caught by a V-shaped catch 82b at the top end of the pivoting rod 82. The pivoting rod 82 is equipped with a turnbuckle 86 in the middle so as to be able to adjust the length of the pivoting rod 82. In addition, the pivoting rod 82 is tied to the frame 2 by means of a chain 87 linked to the top end of the pivoting rod 82 in order to limit the travel of the pivoting rod 82 at a position as described by dottedline in FIG. 1.

Figure 8:
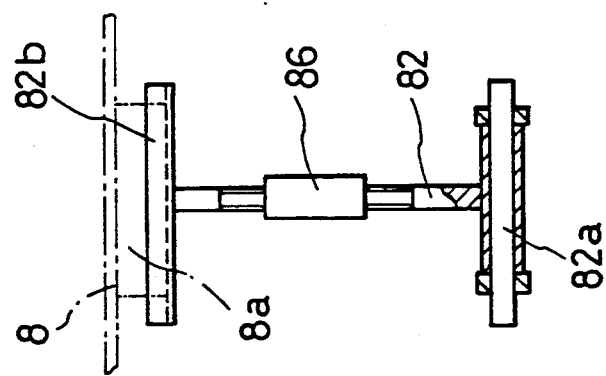
FIG. 8 shows a plan view of the pivoting rod.
Figure 7:
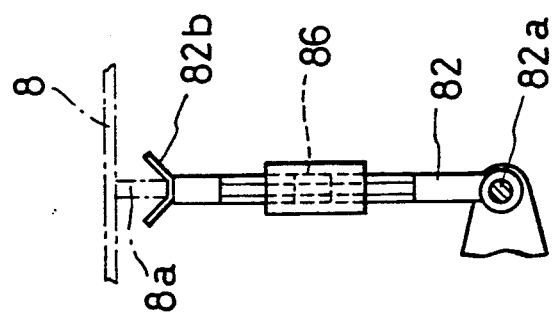
FIG. 7 shows a side view of the pivoting rod for supporting the dirt collecting receptacle.
Figure 6:
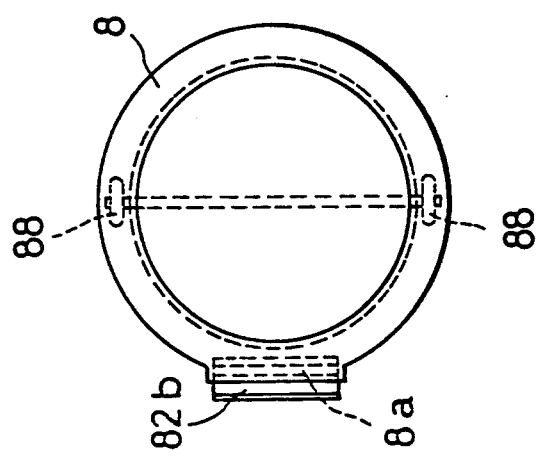
FIG. 6 shows a plan view of the dirt collecting receptacle in the first embodiment.
Figure 9:
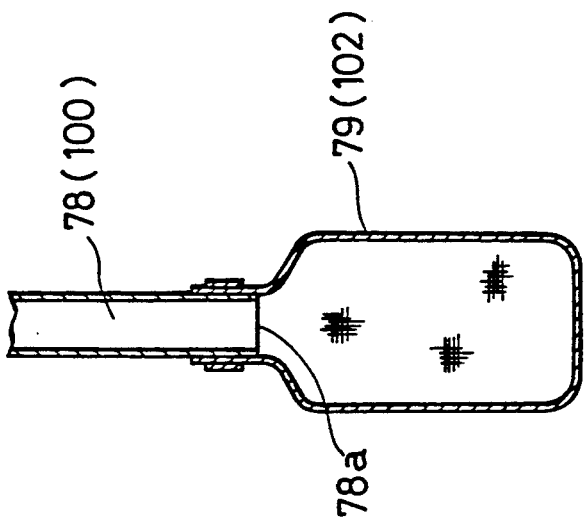
FIG. 9 shows a side view of the locking mechanism for detachably fastening the dust collecting receptacle.
Figure 10:
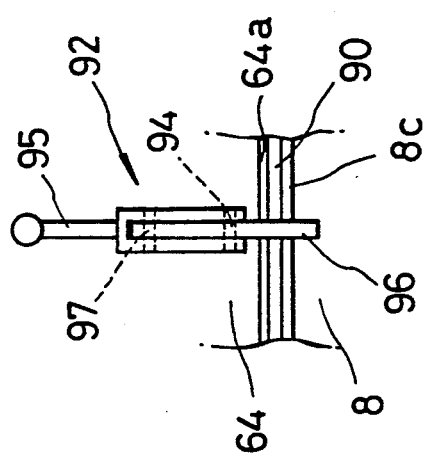
FIG. 10 shows a rear view of the locking mechanism.

The dirt collecting receptacle 8 is adapted to be secured to the bottom flange 64a of the larger-diameter cylindrical part 64 of the main separator 61 by a locking mechanism 92 situated at the opposite side of the dirt collecting receptacle 8 to the hanging member 8a as shown in FIGS. 8 to 10. The locking mechanism 92 comprises a lever 95 whose bottom end is pivotally mounted about a pivot pin 94 secured to brakets 93 provided on the flange 64a of the larger-diameter cylindrical part 64 of the main separator 61 and a hook 96 whose top end is pivotally mounted about a pin 97 at the middle of the lever 95. The bottom end of the hook 96 is so formed as to hook the bottom side of the flange 8c at the top end of the larger-diameter cylindrical part 64 with a ring packing 90 inserted between the flange 64a of the larger-diameter cylindrical part 64 and the flange 8c of the dirt collecting receptacle 8. The dirt collecting receptacle 8 is equipped with wheels 88.

In the above embodiment, dirt sucked together with air from the intake opening 4 is discharged from the air outlet 31b, which enters the larger-cylinder 64 of the main separator 61 through the duct 5. Then, the air containing the dirt goes down with swirling in the larger-diameter cylindrical part 64. Thus, the relatively large dirt such as fallen leaves and pieces of waste paper is separated from the dirt by the assistance of centrifugal force, and falls along the inner surface of the larger-diameter cylindrical part 64 into the dirt collecting receptacle 8.

On the other hand, the relatively small dirt such as dust remaining in the air is carried into the subseparator 62 through the exhaust guide 65. The dust is then separated from the air by the centrifugal dust separators 70. That is, in the centrifugal dust separator 70, the exhaust air entering each outer cylinder 71 through the hole 68a in the bottom partition plate 68 swirls by the vane members 74A of the vane 74. In this condition, the dust in the air is outwardly moved to the inner side of the outer cylinder 71 by the assistance of centrifugal force as the air upward flows with swirling. The air containing most of the dust is then brought into the upper chamber 63a through the space 73 between the top end of the outer cylinder 71 and the funnel-shaped exhaust guide 72, then emitted toward the ground from the dust discharge outlet 78a through the dust discharge duct 78. The air from which the dust is almost removed flows out from the outlet 69a of the hood 75 through the funnel-shaped exhaust guide 72 of each centrifugal dust separator 70 and the hole 69a.

When the dust collected in the dirt collecting receptacle 8 is taken out, first the operator pulls down the lever 95 of the locking mechanism 92 backward to disengage the flange 8c of the dust collecting receptacle 8 with the bottom of the larger-diameter cylindrical part 64. Next the operator releases the hook 96 and pulls the dust collecting receptacle 8 backward while holding flange 8c. Then, the pivoting rod 82 turns backward to bring down the dust collecting receptacle 8 on the ground.

On the other hand, when the dust collecting receptacle 8 is mounted to the bottom of the larger-diameter cylindrical part 64, first the operator engages the hanging member 8a at the front side of the dust collecting receptacle 8 with the catch 82b at the top end of the pivoting rod 82 held at about the same height as that of the hanging member 8a by the chain 87 and then pushes the dust collecting receptacle 8 frontward with lifting the rear side of the dust collecting receptacle 8. As a result, the pivoting rod 82 is pivoted frontward with lifting the dust collecting receptacle 8 to the attaching position. The operator then turns the lever 95 of the locking mechanism 92 to fasten the dust collecting receptacle 8 by the hook 96 under the condition that the dirt colleting receptacle 8 is held under the larger-diameter cylindrical part 64 of the main separator 61.

Figure 12:
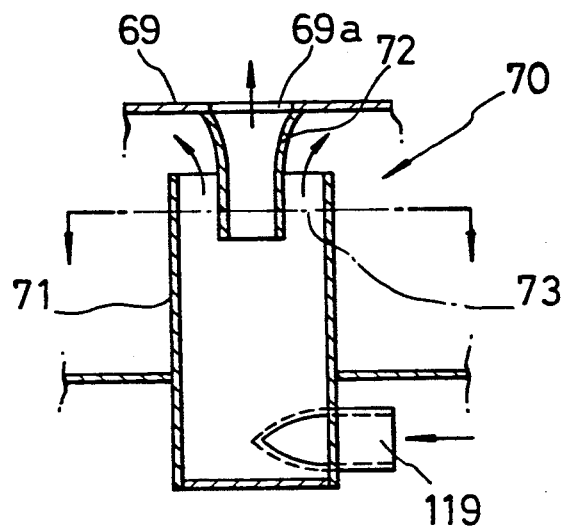
FIG. 12 shows a side sectional view of a modification of the centrifugal dust separators.
Figure 13:
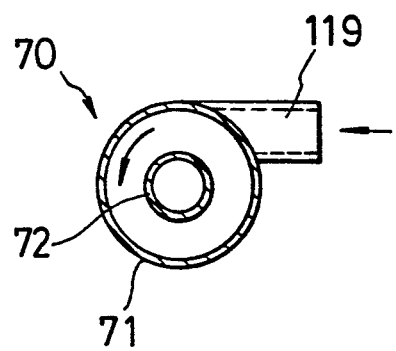
FIG. 13 shows a plan view of the modification.

In this embodiment, centrifugal dust separators each having an inlet pipe 119 for guiding the air in the tangential direction of the separator as shown in FIGS. 12 and 13 may also be used instead of those equipped with the fixed vane 74 as described above.

Although a centrifugal type of separator is used for the main separator 61 in this embodiment, other types of separating means, such as a filter type one, can be used for implementing the present invention.

FIGS. 14 to 17 show the second embodiment of the present invention. This second embodiment is different from the first embodiment in that the exhaust air which flows into the upper chamber 63a from the centrifugal dust separators 70 of the subseparator 67 in the first embodiment and still includes small dust (first side stream) is passed through a second set of centrifugal separators. That is, in the centrifugal separators 70 of the subseparator 62 of the first embodiment, the air from the main separator 61 is divided into the first main stream from which the dust is almost removed and the first side stream including the dust. The amount of the air flow of the first main stream is about 80 percent of that of the air brought from the main separator, while that of the first side stream is about 20 percent thereof. In this case, it is preferable that the amount of the air flow of the first side stream is reduced as small as possible, because when the dust in the first side stream is caught in an auxiliary dust bag, the small amount of the air is easy to pass the bag, or when the dust is discharged outside without the auxiliary dust bag, the small amount of the air flow will not spread the dust so much. It is therefore preferable that the amount of the air flow of the first side stream is to be smaller as far as the air flow is sufficient to carry the dust. Therefore, in view of this the second embodiment is so constructed as to further divide the first side stream into the second main and side streams, in which the second main stream flows out separately or together with the first main stream, and the second side stream whose amount is reduced to 20 percent of that of the first side stream, that is 4 percent of the amount of the air from the main separator carries the dust.

As learned by the above explanation, the construction of the second embodiment excepting that of the second subseparator is substantially the same as that of the first embodiment. Therefore, in the description of the second embodiment below, the same components as those of the first embodiment are designated by the same reference numerals as those used in the description of the first embodiment and the detailed explanation of those same components are omitted in the description of the second embodiment below.

Figure 14:
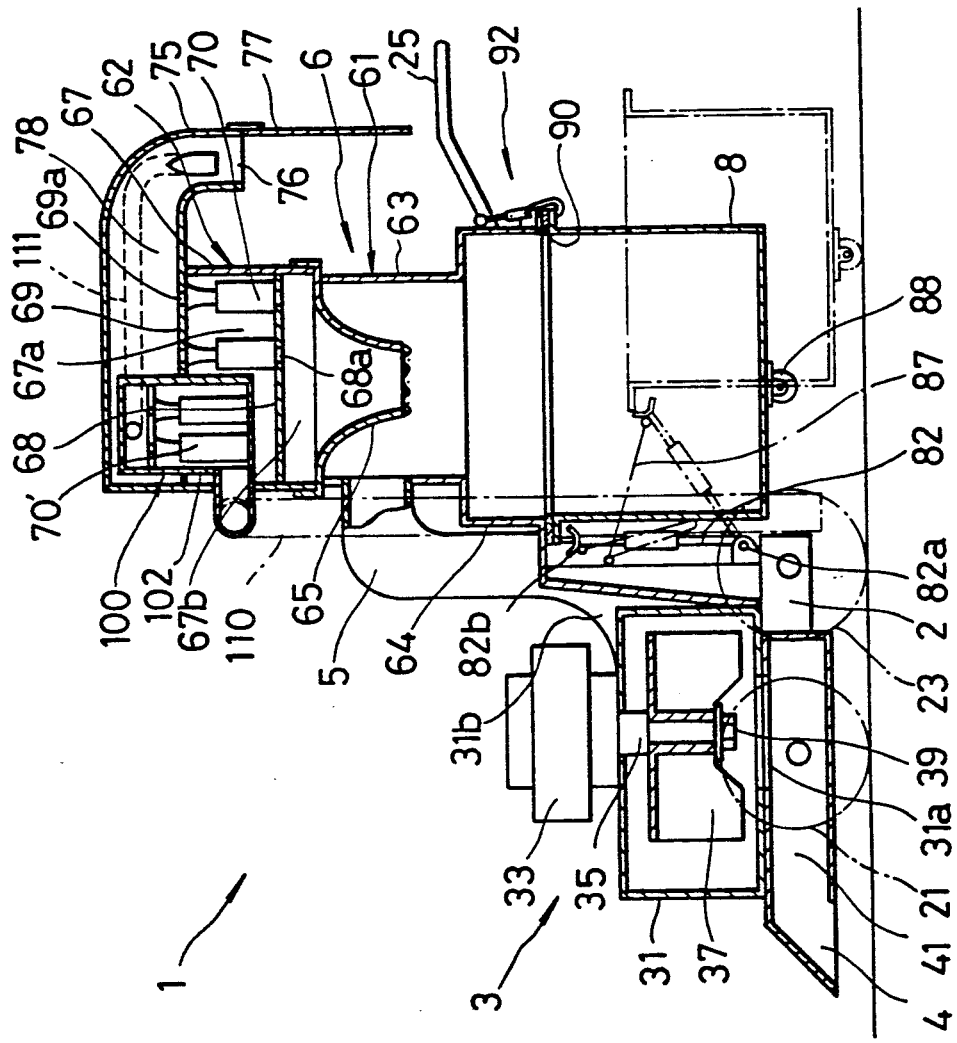
FIG. 14 shows a side sectional view of the second embodiment of the present invention.
Figure 15:
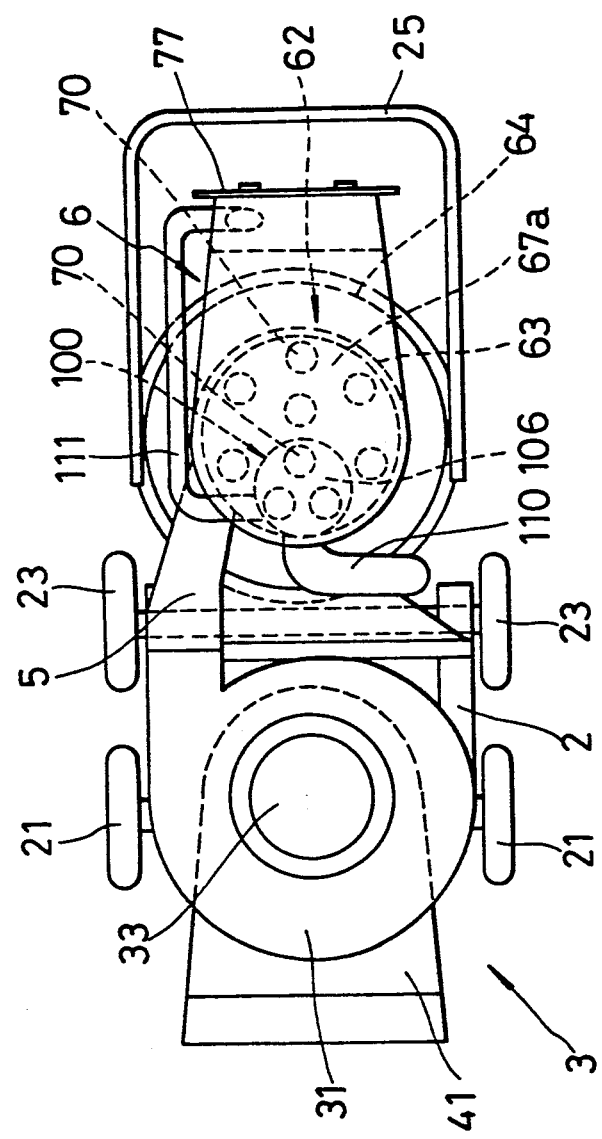
FIG. 15 shows a plan view of the second embodiment.

As shown in FIG. 14, disposed on the main separator 61 is the first subseparator 62 which comprises a plurality of centrifugal dust separators 70. The construction of the first subseparator 62 and centrifugal dust separators 70 is substantially the same as those in the first embodiment. In addition, the second subseparator 100 also comprising a plurality of centrifugal dust separators 70' is disposed inside the cylindrical dust separating chamber 67 of the first subseparator 32 as shown in FIGS. 14 and 17.

The second subseparator 100 is constructed as described below. Namely, as clearly illustrated in FIG. 16, the second subseparator 100 comprises a cylindrical separating chamber 102. The separating chamber 102 is defined by the cylindrical side wall, a bottom plate 103 in which a plurality of holes 103a are formed, a partition plate 104 which divides the inside of the separating chamber 102 into an upper room 105 and a lower room 106, and a top plate 107 which covers the top end. The bottom plate 103 is elevated at an appropriate height from the partition plate 68 of the first subseparator 62. Provided in the lower room 106 of the second subseparator 100 are a plurality of centrifugal dust separators 70'. The construction of each of the centrifugal dust separators 70' is the same as that of the centrifugal dust separators 70 of the first embodiment. That is, the centrifugal dust separator 70' of the second subseparator 100 comprises an outer cylinder 71' whose bottom end is secured on the bottom plate 103 so as to encloses one of the holes 103a in the bottom plate 103 extends upward in the lower room 106. The top end of each outer cylinder 71' is open in the lower room 106, into which the bottom end of a funnel-shaped exhaust guide 72' is extended so as to form an appropriate space 73' between the outer cylinder 71' and the funnel-shaped exhaust guide 72'. The top end of each funnel-shaped exhaust guide 72' is connected to a hole 104a formed in the partition plate 104 justibed above the outer cylinder. Provided in the bottom part of each outer cylinder 71' is a vane 74' having four swirl vane members 74' for whirling the air of the first side stream which enters the outer cylinder 71' from the upper room 67a of the first subseparator 62.

Figure 16:
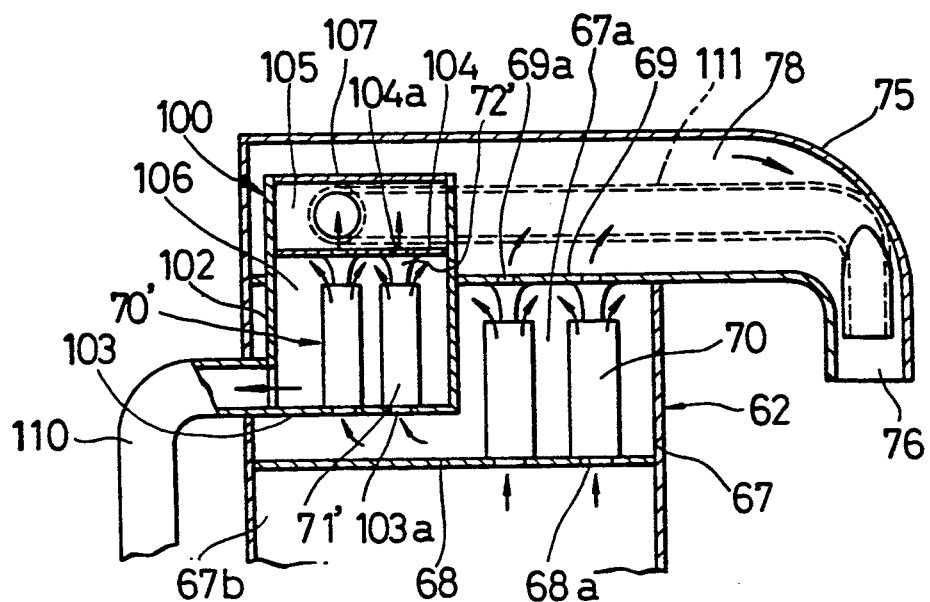
FIG. 16 shows a side sectional view of the subseparator of the second embodiment.
Figure 17:
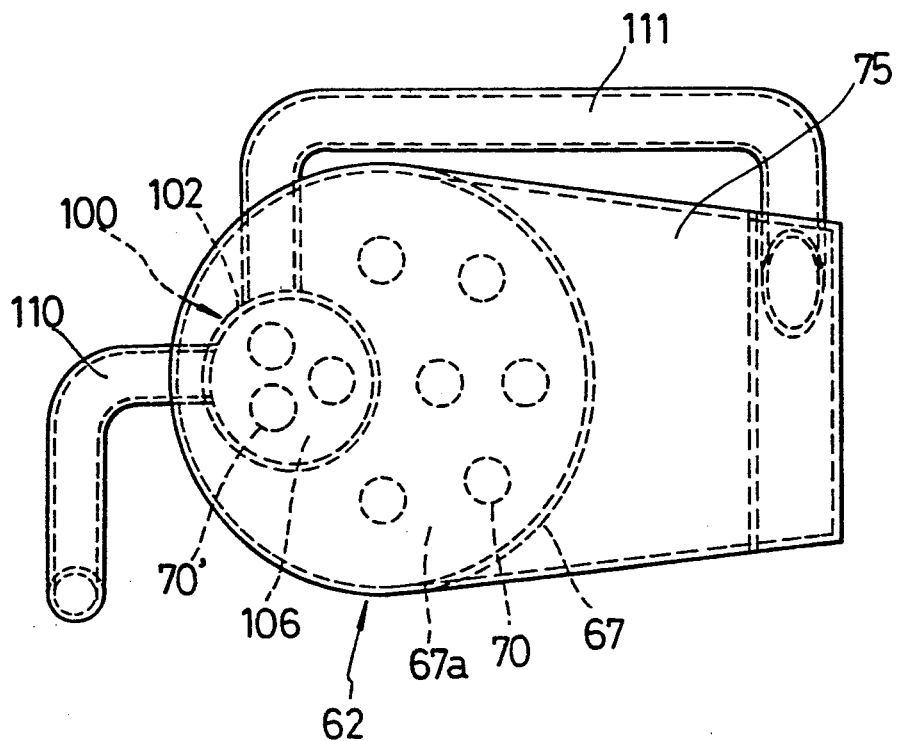
FIG. 17 shows a plan view of the subseparator of the second embodiment.
Figure 18:
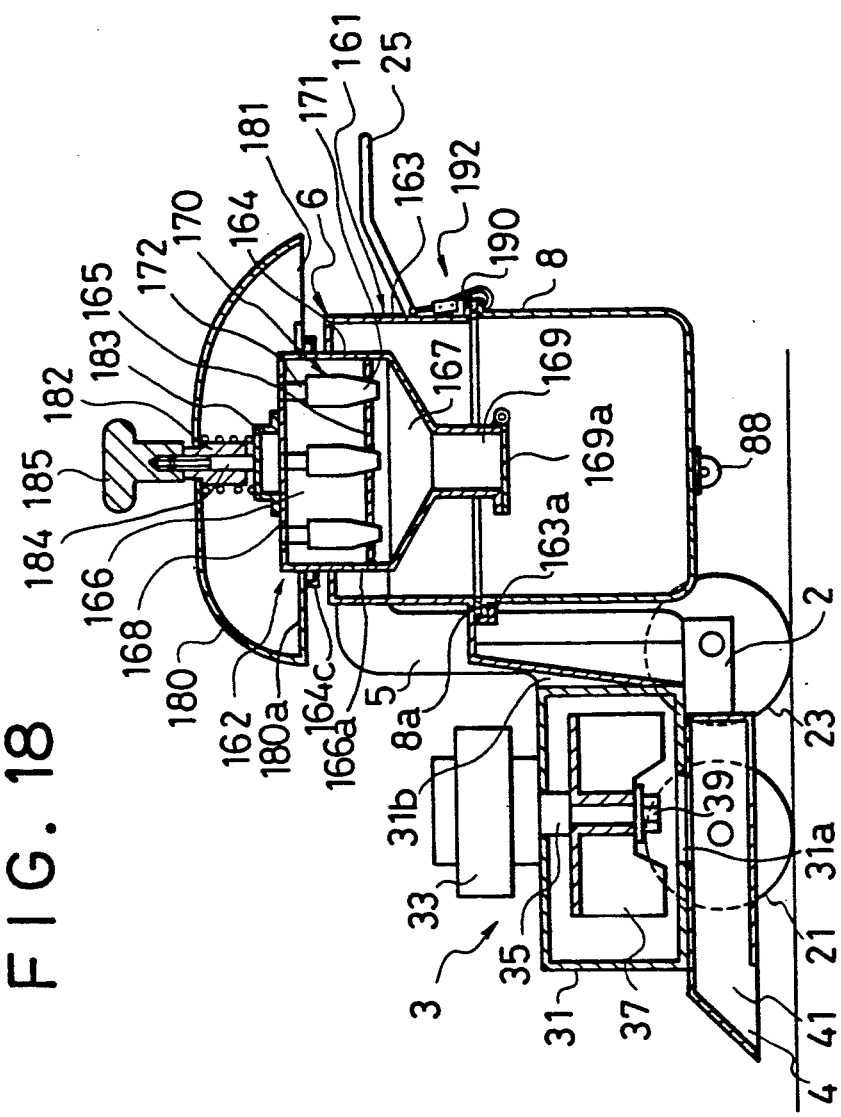
FIG. 18 shows a side sectional view of the third embodiment of the present invention.
Figure 19:
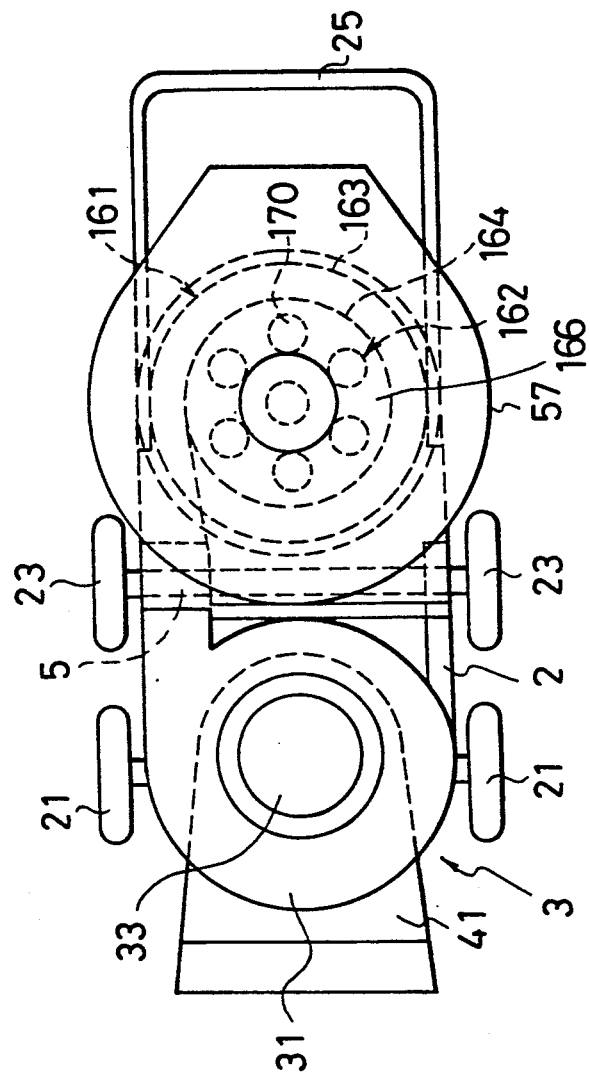
FIG. 19 shows a plan view of the third embodiment.

A dust discharging duct 110 whose bottom end is open close to the ground is connected to the lower room 106 of the second subseparator 100 as clearly illustrated in FIGS. 16 and 17. The second side stream flows out through this dust discharging duct 110. An exhaust duct 111 is connected to the upper room 105 and the other end of the exhaust duct 111 is connected obliquely to the exhaust pass 78 in the hood 75. The second main stream flows out through the exhaust duct 111.

In the second embodiment, dirt such as fallen leaves and dust is sucked together with air from the intake opening 4 by the suction blower 3. Thus sucked air enters the larger-diameter cylindrical part 64 of the main separator 6 through the outlet 31b of the suction blower 3 and the duct 51, and the dirt is also carried into the larger-diameter cylindrical part 64 by the air blown out from the suction blower 3. In this case, relatively large dirt such as fallen leaves and pieces of waste paper is separated from the air while it descends whirlingly in the larger-diameter cylindrical part 64 and falls into the dirt collecting receptacle 8.

Dust contained in the dirt is then carried by the air into the first subseparator 62 through the funnel-shaped air guide 65 of the main separator 61. In the first subseparator 62, the dust is separated from the first main stream by the centrifugal dust separators 70. That is, the air which enters the outer cylinder 71 of each centrifugal dust separators 70 through the hole 68a in the partition plate 68 is whirled by the swirl vane 74 and flows up whirlingly in the outer cylinder 71. In this condition, the dust in the air collects near the inner side of the outer cylinder 71 pulled by the centrifugal force while the air flows up in the outer cylinder 71, and thus collected dust is brought into the upper room 67a through the space 73 between the outer cylinder 71 and the funnel-shaped air guide 72 by the first side stream. The first main stream of the flow of the air from which most dust is removed enters the funnel-shaped air guides 72 of the first centrifugal separators 70. The first main stream then passes through the holes 69a, and flows out from the outlet of the hood 75.

The first side stream next enters the centrifugal dust separators 70' of the second subseparator 100 through the holes 103a in the bottom plate 103 of the second subseparator 100. The second side stream which includes the dust collected in each centrifugal dust separators 70' of the second subseparator 100 enters the lower room 106 in the second subseparator 100 and flows out through the dust discharging duct 110. The second main stream, that is the flow of the air from which the dust is further removed by the centrifugal dust separators 70' flows out through the funnel-shaped air guides 72', the holes 104', the upper room 105, and the exhaust duct 111. In this case, the second main stream is drawn by a lower air pressure produced by the first main stream in the hood to join the first main stream in the hood 75, and flows out.

In the second embodiment described above, the first side stream including the dust separated in the first subseparator is further passed through the second subseparator and divided into the second main and side streams. In this case, the amount of the second side stream containing the separated dust is thereby reduced to 4 percent of the amount of the air sucked in. Accordingly collection of the dust by an auxiliary dust bag is made easier or whirling-up of the discharged dust is considerably reduced.

Although the second subseparator is located inside the first subseparator in this embodiment, it may also be disposed separately from the first subseparator and communicate with the first subseparator by means of a duct. Further an auxiliary dust receptacle 117 such as a cloth bag may be attached to the bottom end of the dust discharge duct 110 as shown in FIG. 11. Further centrifugal dust separators equipped with an inlet guide pipe 119 instead of the swirl vane 74' as shown in FIGS. 12 and 13 can also be used for the first or second subseparators of this embodiment.

FIGS. 18 to 24 show the third embodiment of the vacuum cleaning machine of the present invention. This embodiment differs from the first and second embodiments in the following points.

First, the centrifugal dust separators 70 and 70' employed for the subseparator in the first and second embodiments are so constructed that air enters from the bottom side of each separator and flows upward with whirling, and the dust-separated air and the air including the collected dust both flow out from the top side thereof, while those used in this third embodiment are so constructed that air containing the dust enters from the top side of each separator and flows downward with whirling, in which the separated dust is removed from the bottom side of the separator and the dust-separated air flows out from the top side thereof. This type of centrifugal dust separator improves the dust separating capability. Further, an auxiliary dust receptacle is disposed below the centrifugal dust separators inside the machine. Thus, the emission of the dust into the open air can be prevented. Second, the dirt collecting receptacle 8a is not supported by a pivoting rod as in the first and second embodiments. Third, the hood over the subseparator can be rotated to change the position of the outlet.

The other construction of the third embodiment is substantially the same as that of the first embodiment. Therefore, in the description of the third embodiment described hereinbelow, the same components as those of the first embodiment are designated by the same reference numerals as in the description of the first embodiment and the detailed explanation of them are omitted.

The air duct 5 is extended from the outlet 31b of the suction blower 3 mounted on the frame 2 to the dust separator 6. The dust separator 6 comprises a main separator 161 for removing relatively large dirt from the air and a subseparator 162 for removing small dirt from the air passing through the main separator 6. The main separator 161 comprises a cylindrical part 163 in which the duct 5 is opened. The duct 5 is lead to the cylindrical part 163 along a tangential line so that the air from the suction blower 3 whirls along the inner side of the cylindrical part 163.

Disposed at the center of the cylindrical part 163 is the cylindrical subseparator 162. The subseparator 162 comprises a cylindrical separating chamber 164 and an auxiliary dust receptacle 169 located at the bottom of the funnel-shaped section extended from the bottom end of the separating chamber 164. The separating chamber 164 is divided into an upper room 166 and a lower room 167 by a horizontal partition plate 165. The top side of the upper room 166 is defined by a top plate 168. Formed at the bottom part of the cylindrical side wall of the upper room 166 are a plurality of inlet holes 166a for communicating the upper room 166 with the main separator 161. In the upper room 166, a plurality of centrifugal dust separators 170 are located.

Figure 20:
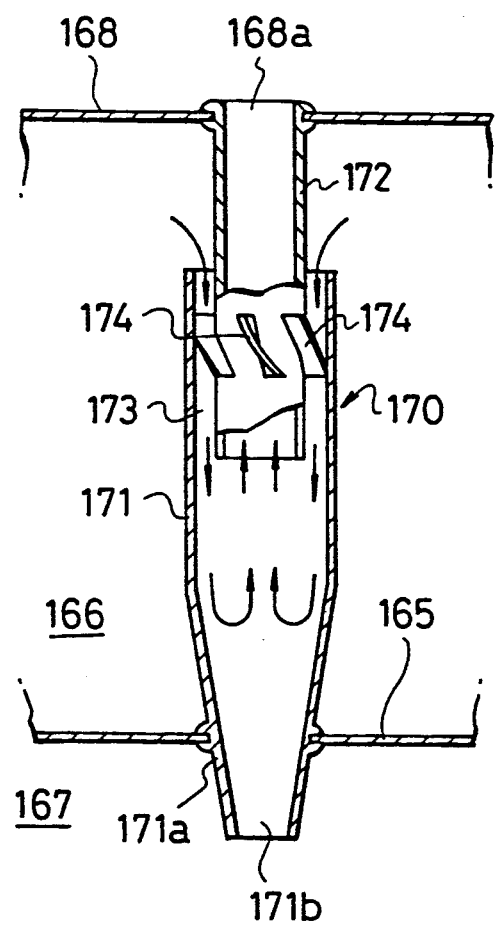
FIG. 20 shows a side sectional view of one of the centrifugal separators of the third embodiment.

Each centrifugal dust separator 170 comprises an outer cylinder 171 which is held upright with the bottom end extended through the partition plate 165 as shown in FIG. 20. The bottom part 171a of the outer cylinder 171 is tapered toward the bottom end and the bottom end is open in the lower room 169 through an opening 171b. A plurality of holes 168a are formed in the top plate 168 of the upper room 166 of the separating chamber 164 right above each outer cylinder 171. An inner cylinder 172 is extended downward from each hole 168a into the upper part of the outer cylinder 171 with an appropriate space 173 between the outer and inner cylinders. The inner cylinder 172 is provided with a plurality of vanes for rotating the air which flows downward through the space 173 around the part inserted in the outer cylinder 173.

The bottom of the lower room 165 is tapered and the bottom end of the tapered bottom is extended downward to form the auxiliary dust receptacle 169. The auxiliary dust receptacle 169 is equipped with a bottom hood 169a which can be opened and closed air tightly Rotatably mounted on the subseparator is a hood 180 for guiding the air which flows out from the inner cylinders 172 of the subseparators 170.

Figure 21:
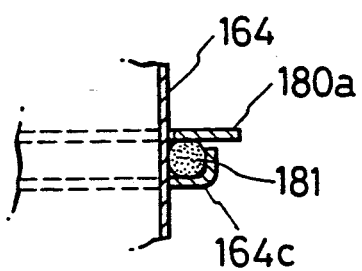
FIG. 21 shows an enlarged partial sectional view of the mounting structure of the hood in the third embodiment.

The hood 180 is equipped with an outlet 181 directed downward. The bottom plate 180a is rotatably supported on the L-section flange 164c protruded around the separating chamber 164 of the subseparator with a ring seal 181 between them as shown in FIG. 21.

Figure 22:
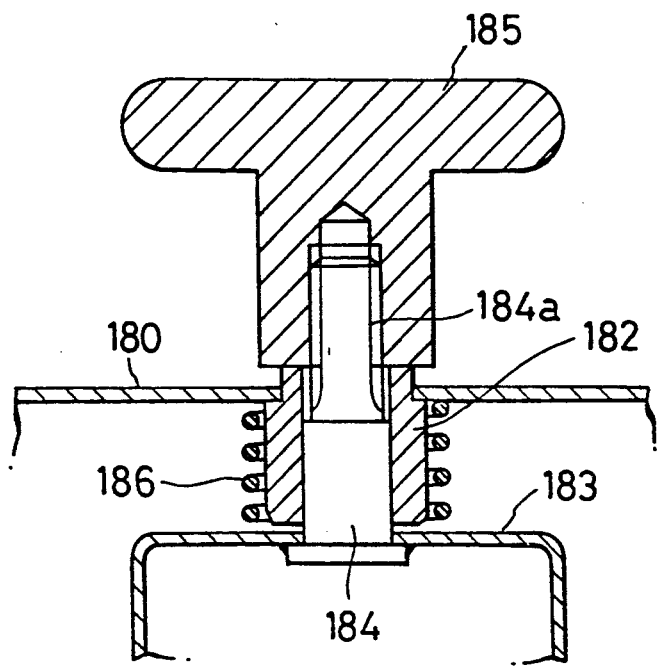
FIG. 22 shows an enlarged partial sectional view of the locking mechanism of the hood in the third embodiment.

As better shown in FIG. 22, a tubular member 182 is attached to the center of the hood 180 from inside. The tubular member 182 is secured rotatably and up-and-down movably about a pin 184 whose bottom end is fixed to a trapezoidal bracket 183 attached on the top plate 16 of separating chamber 164. The pin 184 is protruded above the hood 180 through the tubular member 182 and the protruded part is threaded. A handle 185 is screwed on the threaded part 184a of the pin 184. A spring 186 is put about the tubular member 182 and pressed between the bracket 183 and the hood 180 for pushing up the hood 180. The hood 180 is locked to the bracket 183 by fastening the handle 185 and released rotatable by loosening the handle 185. Whereby the outlet 181 of the hood 180 can be properly positioned according to the environmental conditions. A filter net may be disposed at the outlet 181 or another appropriate place in the hood.

Figure 23:
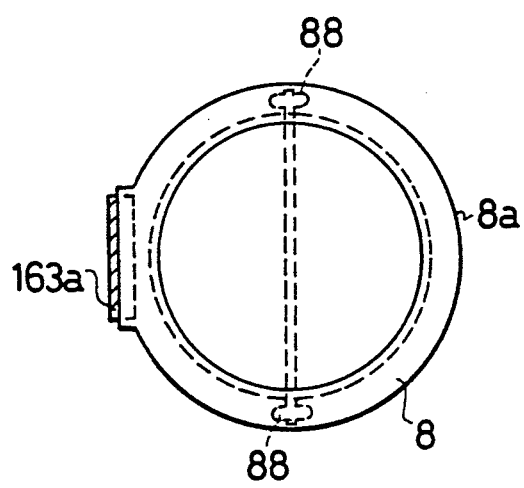
FIG. 23 shows an plan view of the dust collecting receptacle of the third embodiment.
Figure 24:
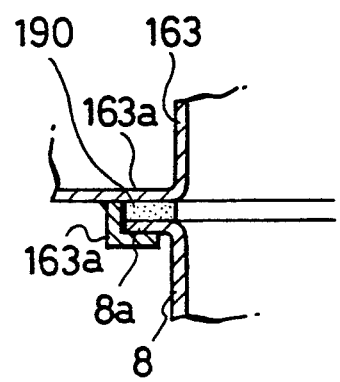
FIG. 24 shows an enlarged partial sectional view of the sealing construction of the dust collecting receptacle of the embodiment.
Figure 25:
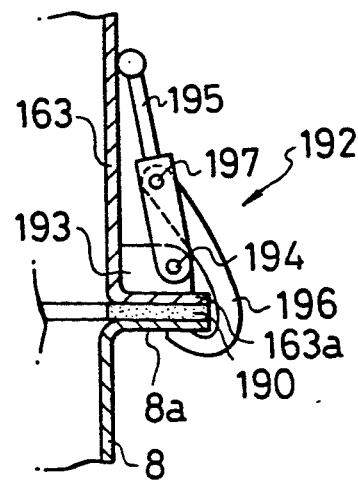
FIG. 25 shows a side sectional view of the locking mechanism of the dirt collecting receptacle.
Figure 26:
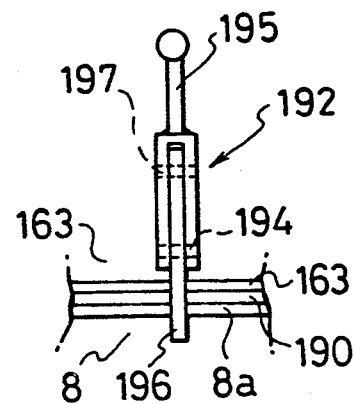
FIG. 26 shows a rear view of the locking mechanism.

Disposed under the cylindrical part 163 of the main separator 161 is a dust receptacle 8 made of a non-air-permeable material. A flange 8a is formed around the top end of the dust collecting receptacle 8. The dust receptacle 8 is detachably attached to the bottom end of the cylindrical part 163 of the main separator 161 with a ring packing 190 put between them as shown in FIGS. 23 and 24. A L-section hooking member 163a is disposed below and a little to the suction blower side of the bottom end of the cylindrical part 163 and the front part of the flange 8a of the dust receptacle 8 is hung on the hooking member 163a. The rear part of the flange 8a of the dust receptacle 8 is locked to the bottom end of the cylindrical part 163 by a locking mechanism 192. The dust receptacle 8 can be dismounted from the cleaning machine by releasing the locking mechanism 192.

The locking mechanism 192 comprises a lever 195 which is mounted about a pin 194 secured to brackets 193 protruded on the flange 163a around the bottom end of the cylindrical part 163 of the main separator 161 and a hook 196 whose top end is pivoted by a pin 197 to the lever 195. The hook 196 holds the flange 8a around the top end of the dust receptacle 8 pressing to the flange 163a with the packing 190 between them.

In the third embodiment described above, dirt sucked by the suction blower 3 enter the cylindrical part 163 of the main separator 161 carried by the air blown out from the suction blower 3 and whirls in the cylindrical part 163. While they are whirling, relatively large dirt such as fallen leaves and pieces of waste paper separate from the air and fall into the dirt collecting receptacle 8, but small dirt such as dust further which is carried by the air enters the separating chamber 164 of the subseparator 162 through the inlet holes 166a and then the centrifugal dust separators 170.

In each centrifugal dust separator 170, the air entering the space 173 flows downward with rotating around the inner cylinder 172 due to the vane 174. The dust in the air is then separated from the air and corrected to the inner side of the outer cylinder 171 by the assistance of the centrifugal force, and then falls into the lower room 167 through the opening 171b at the bottom end of the outer cylinder 171. The dust is then collected in the auxiliary dust receptacle 169. The substantially dust free air enters the inner cylinder 172 and then flows out from the outlet 181 of the hood 180. The position of the outlet 181b can be changed as necessary by loosening the handle 185, turning the hood 180, then fastening the handle 185.

In order to take out the dirt collected in the machine, the operator pulls down the lever 195 of the locking mechanism 192 rearward to unlock the flange 163a. The operator then releases the flange 163a from the hook 196 while holding the rear part of the collecting receptacle 8 and pulls the dust receptacle 8 rearward Thereby the flange 8a at the front side comes off the hooking member 163a and the dust receptacle 8 lands on the ground. By opening the bottom hood 169a in this state, the dust in the auxiliary dust receptacle 169 can be dropped into the dirt collecting receptacle 8.

Although the centrifugal type separator is used for the main separator 161 in the above embodiment, other separating means such as filters may also be used.

This third embodiment can separate fine dust with the improved dust separating capability and collect separated dirt and dust in a dirt collecting receptacle and an auxiliary dust receptacle inside the machine, respectively, without discharging the separated dust in the open air. Then this embodiment can improve the working condition for the operator and decrease contamination of the environment.

Figure 27:
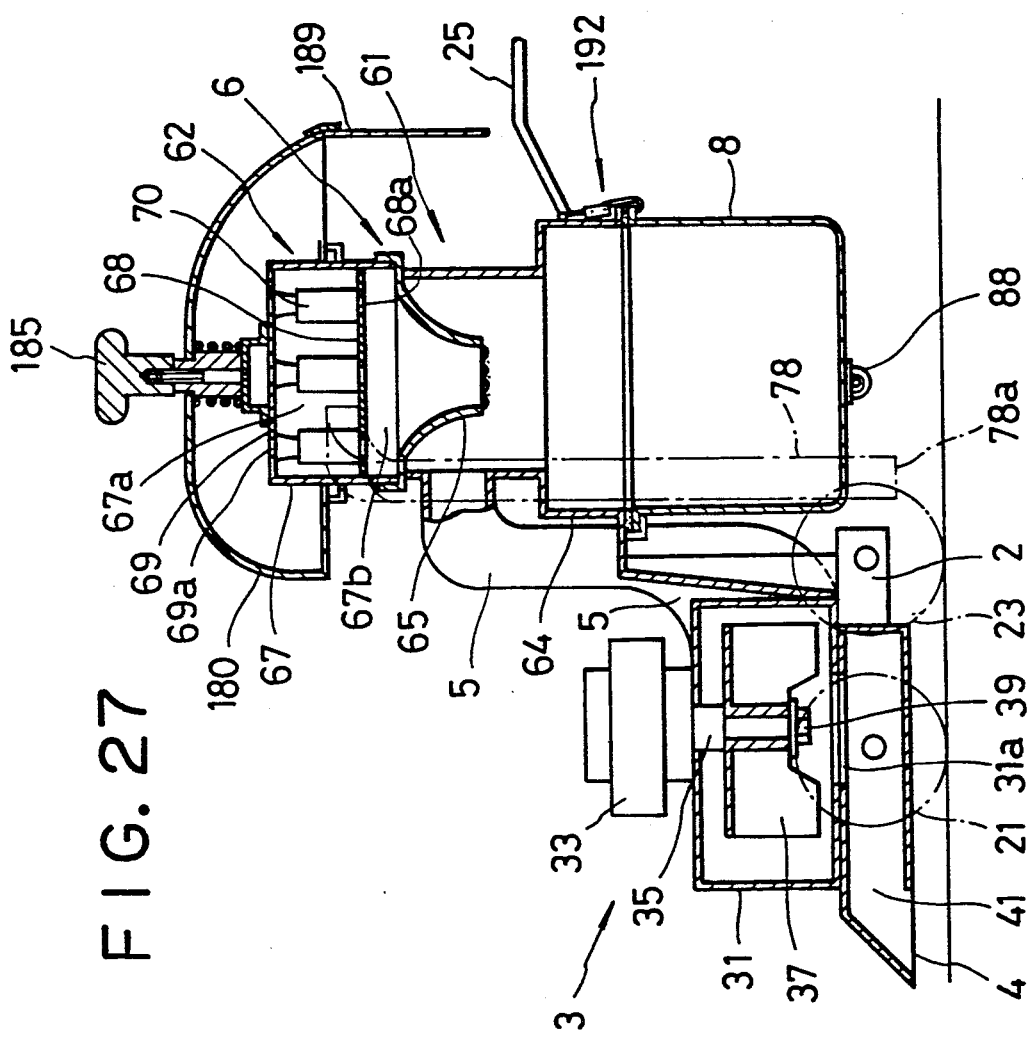
FIG. 27 shows a side sectional view of the fourth embodiment of the present invention.
Figure 28:
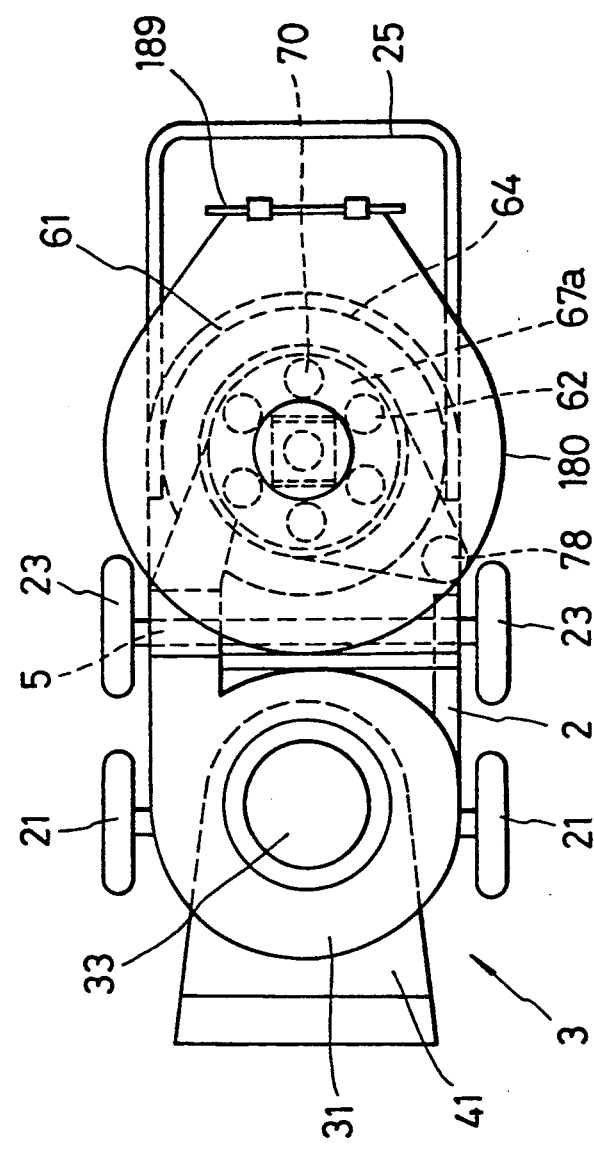
FIG. 28 shows a plan view of the fourth embodiment.

FIGS. 27 and 28 show the fourth embodiment of the cleaning machine of the present invention. The fourth embodiment has the same construction as the third embodiment except that the subseparator of the fourth embodiment is the same as that of the first embodiment and that an air shield 189 is extended below behind the outlet 181 of the hood 180. Then the operation and advantages of the fourth embodiment are about the same as those of the first and third embodiments. Accordingly the detailed descriptions of the fourth embodiment are omitted.

It should be understood that the spirit and scope of the present invention are never limited by the particular embodiments described above and are defined only by the appended claims.

What is claimed is:

1. A cleaning machine comprising:
    a frame having wheels;
    a suction blower having an air inlet and an air outlet and mounted on the frame;
    an intake opening for sucking dirt containing relatively large dirt such as fallen leaves and relatively small dirt such as dust together with air by the sucking force generated by the suction blower, the intake opening communicating with the air inlet of the suction blower;
    a dirt separator for separating the dirt from the air, the dirt separator communicating with the air outlet of the suction blower by means of a duct, the dirt separator comprising a main separator for separating the relatively large dirt from the air, and a subseparator for separating the dust from the air discharged from the main separator;
    the subseparator including a plurality of centrifugal dust separators for separating the dust from the air by centrifugal force;
    a dirt receptacle for collecting the relatively large dirt separated by the main separator, the dirt receptacle being detachably attached under the main separator;
    the subseparator further including a cylindrical dust separating chamber defined by a cylindrical wall having a plurality of openings, a top plate and a bottom partition plate, the cylindrical dust separating chamber disposed within the main separator and communicating with the main separator through the openings formed in the cylindrical wall;
    an auxiliary dust collector connected under the separating chamber for collecting the dust separated by the subseparator, the auxiliary dust collector having a cylindrical body portion including an open lower end extending into the main separator dirt receptacle, and having an operable bottom hood pivotally mounted on said open lower end, the bottom hood having a first selectable position for sealing engagement with the open lower end; and
    each of the centrifugal dust separators being so constructed that the dust separated from the air drops into the auxiliary dust collector and the air from which the dust is removed flows out above the top plate of the dust separating chamber.

2. A cleaning machine as claimed in claim 1, wherein each of the centrifugal dust separators comprises:
    an outer cylinder having a tapered lower portion including a bottom end, the bottom portion extending partially through one said opening in the bottom partition plate, the bottom end communicating with the auxiliary dust collector;
    an inner cylinder smaller than the outer cylinder in diameter, the inner cylinder having an upper portion including an open top end and having a lower portion including an open bottom end, the upper portion extending partially through one said opening in the top plate so that the open top end is disposed above the top plate, and the lower portion extending downwardly into the outer cylinder so as to form an annular space between the inner and outer cylinders for receiving air flowing into the subseparator from the main separator; and
    vane means for whirling the air flowing into the outer cylinder through the annular space, the vane means being disposed on an outer circumference of the inner cylinder, and disposed within the outer cylinder.

3. A cleaning machine, comprising:
    a frame having wheels;
    a suction blower having an air inlet and an air outlet and mounted on the frame;
    an intake opening for sucking dirt containing relatively large dirt such as fallen leaves and relatively small dirt such as dust together with air by the sucking force generated by the suction blower, the intake opening communicating with the air inlet of the suction blower;

a dirt separator for separating the dirt from the air, the dirt separator communicating with the air outlet of the suction blower by means of a duct, the dirt separator comprising a main separator for separating the relatively large dirt from the air and a subseparator for separating the dust from the air discharged from the main separator;

a dirt receptacle for collecting the relatively large dirt separated by the main separator, the dirt receptacle being detachably attached under the main separator; and a hood having an inlet for receiving the substantially dust-free air from the subseparator, the hood also having an outlet for discharging the substantially dust-free air to the surrounding area, the hood being rotatably mounted above the dirt separator so that the direction of the outlet can be changed according to working conditions.

4. A cleaning machine claimed in claim 3, wherein the hood is rotatably mounted on the subseparator through a locking mechanism, which comprises:

a tubular member attached to the center of the hood from inside;

a pin fixed on the top of the subseparator so as to protrude above the hood through the tubular member, and the pin being threaded on the protruding part thereof;

a spring disposed around the pin between the hood and the subseparator so as to urge the hood upward; and a handle screwed on the threaded portion of the pin for locking the hood when tightened and releasing the hood to be rotatable when loosened.

5. A cleaning machine, comprising:

a frame having wheels;

a suction blower having an air inlet and an air outlet and mounted on the frame;

an intake opening for sucking dirt containing relatively large dirt such as fallen leaves and relatively small dirt such as dust together with air by the sucking force generated by the suction blower, the intake opening communicating with the air inlet of the suction blower;

a dirt separator for separating the dirt from the air, the dirt separator communicating with the air outlet of the suction blower by means of a suction blower outlet duct, the dirt separator comprising a main separator for separating the relatively large dirt from the air, and a subseparator for separating the dust from a portion of the air discharged from the main separator;

the subseparator including a plurality of centrifugal dust separators for separating the dust from a portion of the air passing therethrough by centrifugal force;

the subseparator further including a substantially cylindrical dust separating chamber defined by a cylindrical wall, a top plate having a plurality of holes, and a bottom partition plate having a plurality of holes, the cylindrical dust separating chamber being disposed above the main separator and communicating with the main separator through the holes of the bottom partition plate;

the plurality of centrifugal dust separators being disposed in the cylindrical dust separating chamber for receiving air discharged from the main separator through the holes of the bottom partition plate, for separating substantially all of the dust therefrom, and for discharging substantially dust-free air from the cylindrical dust separating chamber to a hood disposed above the dust separating chamber;

each centrifugal dust separator having a cylindrical body mounted on the bottom partition plate so as to enclose one said hole in the bottom partition plate; having vane means for whirling the air flowing up into the cylindrical body from the main separator, the vane means mounted inside the cylindrical body;

each centrifugal dust separator having a funnel-shaped air guide for discharging the substantially dust-free air from the dust separating chamber to the hood, the funnel-shaped air guide having a larger-diameter top portion and a smaller-diameter bottom portion, the funnel-shaped air guide being mounted on the top plate in such a manner that the larger-diameter top portion encloses one said hole in the top plate and the smaller-diameter bottom portion is partially inserted into the cylindrical body; and a dirt receptacle for collecting the relatively large dirt separated by the main separator, the dirt receptacle being detachably attached under the main separator.

6. A cleaning machine as claimed in claim 5, wherein the main separator comprises an upper cylindrical portion having an open bottom end, a lower cylindrical portion greater in diameter than the upper cylindrical portion and concentrically connected to the bottom end thereof, and a funnel-shaped inner guide concentrically and downwardly protruding into the upper cylindrical portion from above; and the upper cylindrical portion having a peripheral opening for receiving the air and dirt from the suction blower outlet duct tangentially within the upper cylindrical portion.

7. A cleaning machine as claimed in claim 5, further comprising a dust discharging duct for guiding the dust-laden air discharged from the subseparator to an area near the ground, the dust discharging duct having an outlet opening near the ground.

8. A cleaning machine, comprising:

a frame having wheels;

a suction blower having an air inlet and an air outlet and mounted on the frame;

an intake opening for sucking dirt containing relatively large dirt such as fallen leaves and relatively small dirt such as dust together with air by the sucking force generated by the suction blower, the intake opening communicating with the air inlet of the suction blower;

a dirt separator for separating the dirt from the air, the dirt separator communicating with the air outlet of the suction blower by means of a suction blower outlet duct, the dirt separator comprising a main separator for separating the relatively large dirt from the air, and a subseparator for separating the dust from a portion of the air discharged from the main separator;

the subseparator including a plurality of centrifugal dust separators for separating the dust from a portion of the air passing therethrough by centrifugal force;

the subseparator further including a substantially cylindrical dust separating chamber defined by a cylindrical wall, a top plate having a plurality of holes, and a bottom partition plate having a plurality of holes, the cylindrical dust separating chamber being disposed above the main separator and communicating with the main separator through the holes of the bottom partition plate;

the plurality of centrifugal dust separators being disposed in the cylindrical dust separating chamber for receiving air discharged from the main separator through the holes of the bottom partition plate, for separating substantially all of the dust therefrom, and for discharging substantially dust-free air from the cylindrical dust separating chamber to a hood disposed above the dust separating chamber;

each centrifugal dust separator having a cylindrical body mounted on the bottom partition plate so as to enclose one said hole in the bottom partition plate, vane means mounted inside the cylindrical body for whirling the air flowing up into the cylindrical body from the main separator, and a funnel-shaped air guide for discharging the substantially dust-free air from the dust separating chamber to the hood, the funnel-shaped air guide having a smaller-diameter bottom portion partially inserted into the cylindrical body and a larger-diameter top portion, the funnel-shaped air guide being mounted on the top plate so that the larger-diameter top portion encloses one said hole in the top plate;

a dirt receptacle for collecting the relatively large dirt separated by the main separator, the dirt receptacle being detachably attached under the main separator;

a dust discharging duct for guiding the dust-laden air discharged from the subseparator to an area near the ground, the dust discharging duct having an outlet opening near the ground; and an auxiliary dust collector for collecting the dust carried by the air flowing in the dust discharging duct.

9. A cleaning machine as claimed in claim 8, wherein the auxiliary dust collecting means is a cloth bag which is attached to the outlet of the dust discharge duct.

10. A cleaning machine, comprising:

a frame having wheels;

a suction blower having an air inlet and an air outlet and mounted on the frame;

an intake opening for sucking dirt containing relatively large dirt such as fallen leaves and relatively small dirt such as dust together with air by the sucking force generated by the suction blower, the intake opening communicating with the air inlet of the suction blower;

a dirt separator for separating the dirt from the air, the dirt separator communicating with the air outlet of the suction blower by means of a duct, the dirt separator comprising a main separator for separating the relatively large dirt from the air, and a subseparator for separating the dust from the air discharged from the main separator;

the subseparator including a plurality of centrifugal dust separators for separating the dust from the air by centrifugal force;

the plurality of centrifugal dust separators including a plurality of first centrifugal dust separators for separating the dust-containing air from the main separator into a substantially dust-free first main stream and a dust-laden first side stream by means of centrifugal force caused by whirling the air;

the plurality of centrifugal dust separators further including a plurality of second centrifugal dust separators for separating the dust-laden first side stream into a substantially dust-free second main stream and a dust-laden second side stream by means of centrifugal force caused by whirling the air in the first side stream; and a dirt receptacle for collecting the relatively large dirt separated by the main separator, the dirt receptacle being detachably attached under the main separator.

11. A cleaning machine as claimed in claim 10, wherein each of the first and second centrifugal dust separators comprises:

a cylindrical body;

vane means for whirling the air flowing inside the cylindrical body, the vane means disposed in the cylindrical body; and a funnel-shaped air guide for discharging the substantially dust-free main stream of air, the funnel-shaped air guide protruding downwardly into the cylindrical body from above so as to form a space between the cylindrical body and the funnel-shaped air guide.

12. A cleaning machine as claimed in claim 10, further comprising a first exhaust duct for guiding the first main streams flowing from the first centrifugal dust separators to an appropriate discharging position, and a second exhaust duct for receiving the second main streams flowing from the second centrifugal dust separators, the second exhaust duct communicating with the first exhaust duct so that the second main streams are drawn into the first exhaust duct by a reduced pressure in the first exhaust duct caused by flow of the first main streams therein.

13. A cleaning machine according to claim 10, further comprising a dust discharging duct for guiding the air including the relatively small dirt separated by the subseparator near the ground.

14. A cleaning machine as claimed in claim 13, wherein an auxiliary dust collector for catching the dust separated by the subseparator is in communication with the dust discharging duct.

15. A cleaning machine as claimed in claim 14, wherein the auxiliary dust collector is a cloth bag attached to an outlet of the duct discharging duct.

* * * * *